United States Patent [19]

Elkins et al.

[11] 4,289,432

[45] Sep. 15, 1981

[54] FLAT WOOD BIT ADAPTER

[76] Inventors: Johnny C. Elkins, 120 W. 4th St.; Marvin C. Hanz, 423 S. Irving, both of San Angelo, Tex. 76901

[21] Appl. No.: 66,491

[22] Filed: Aug. 13, 1979

[51] Int. Cl.[3] .............................................. B23B 51/00

[52] U.S. Cl. ................................ 408/201; 145/116 R; 145/129; 408/82; 408/241 R

[58] Field of Search ................... 408/201, 200, 81, 82, 408/211, 225, 241 R, 703; 144/219, 241; 145/116 R, 129

[56] References Cited

U.S. PATENT DOCUMENTS

| | | | |
|---|---|---|---|
| 413,316 | 10/1889 | Dobson | 408/201 |
| 676,669 | 6/1901 | Wack | 408/201 |
| 4,043,698 | 8/1977 | Chelberg | 408/201 |

*Primary Examiner*—Z. R. Bilinsky
*Attorney, Agent, or Firm*—Marcus L. Bates

[57] ABSTRACT

An adapter for use with a commercially available flat wood bit which enables a previously bored hole formed in a work piece to be accurately and easily enlarged. The adapter includes spaced keepers which snugly receive the opposed flats of the bit therebetween, with the pilot bit being centered within a cavity formed within the adapter, so that the adapter is properly aligned respective to the wood bit and to the previously formed hole. The adapter includes a number of cylinders of various outside diameters which enables a single adapter body to be used in conjunction with a number of different size bits which are used to form a number of different diameter holes.

7 Claims, 19 Drawing Figures

FLAT WOOD BIT ADAPTER

BACKGROUND OF THE INVENTION

The modern flat wood bit has revolutionized the boring of holes through wood and other similar materials. The flat wood bit is inexpensive, easy to use, and requires very little space for storage.

A carpenter often drills a hole through a work piece and subsequently discovers that the hole is slightly undersized. Reaming the original hole to a larger size presents a problem because the larger proper size wood bit cannot be accurately aligned with the previously drilled hole in order to bore the small hole to the desired larger size.

U.S. Pat. No. 4,043,698 suggests a cylindrical, slotted follower attachable to the flat of a wood bit by a set screw in order to enable the next size flat bit to be used. This requires a considerable amount of time in attaching and removing the cylindrical follower or guide means from the end of the bit.

U.S Pat. No. 3,748,052 discloses an adjustable flat wood bit having cutters arranged externally thereof for enlarging or reaming a hole to a larger size.

U.S. Pat. No. 3,712,753 sets forth a device which includes two replaceable drills. One drill makes a small hole while the second makes a larger hole.

U.S. Pat. Nos. 3,309,945 and 3,244,033 each discloses a counterbore pilot for enlarging previously drilled holes.

U.S. Pat. Nos. 2,667,795 and 631,572 relate to reaming attachments for bits wherein a first hole is formed and thereafter the hole is reamed to a larger size.

The present invention differs from the prior art by the provision of an adapter device which is low in cost, simple in construction, and which can be easily and quickly removably placed on the end of a flat wood bit so as to enable a previously bored hole to be accurately increased to a larger size.

SUMMARY OF THE INVENTION

An adapter in combination with a flat wood bit for enlarging a hole previously bored into a work piece. The adapter includes a circular body of a diameter to be slidably received in close tolerance relationship within the previously bored hole of the work piece. A cavity formed centrally within the circular body receives the pilot or tip of the flat wood bit, thereby centering the adapter respective to the flat bit.

Spaced, upstanding keepers have one end affixed to a rear face of the circular body, with the other end extending therefrom. The keepers include an adjacent flat face. The terminal or free end of the keepers may be sprung away from one another. The flat portion of the bit is received within the slot formed by the adjacent faces of the keepers, with the keepers being placed sufficiently close to one another so that the flat faces thereof engage the opposed flat faces of the bit with sufficient friction to maintain the adapter in aligned relationship respective to the flat bit.

A primary object of the present invention is the provision of an adapter for use in combination with an ordinary flat wood bit.

A further object of the present invention is the provision of an adapter apparatus in combination with a flat wood bit whereby the adapter can be removably affixed to the flat bit and used as a guide for centering the wood bit respective to the previously drilled hole, thereby enabling the hole to be enlarged.

A still further object of this invention is the provision of an adapter for use in combination with a flat wood bit which enables previously drilled holes to be bored to a larger size.

Another and still further object of the present invention is the provision of an adapter used in combination with a flat wood bit which enables a number of different size previously drilled holes to be enlarged to some predetermined size by the use of a number of different cylindrical attachment members which are incorporated into the adapter.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

DETAILED DESCRIPTION OF THE PREFERRED EMBODIMENT

Figure 4:
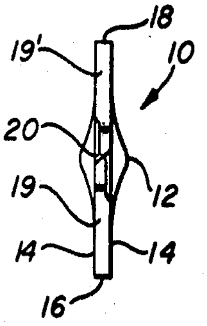
FIG. 4 PRIOR ART
FIG. 4 is a front end view of a prior art flat wood bit.
Figure 7:
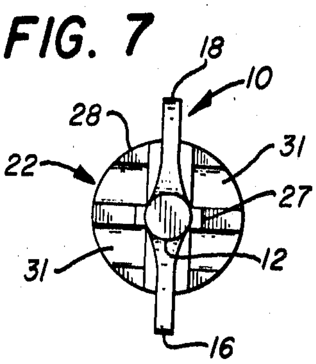
FIG. 7 is an end view of part of the apparatus disclosed in FIG. 6.
Figure 9:
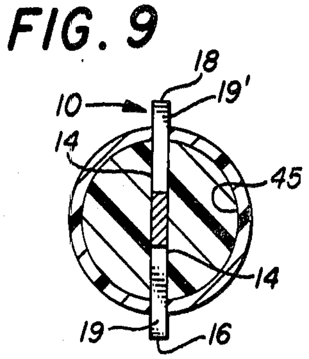
FIG. 9 is a cross-sectional view taken along line 9—9 of FIG. 8.
Figure 5:
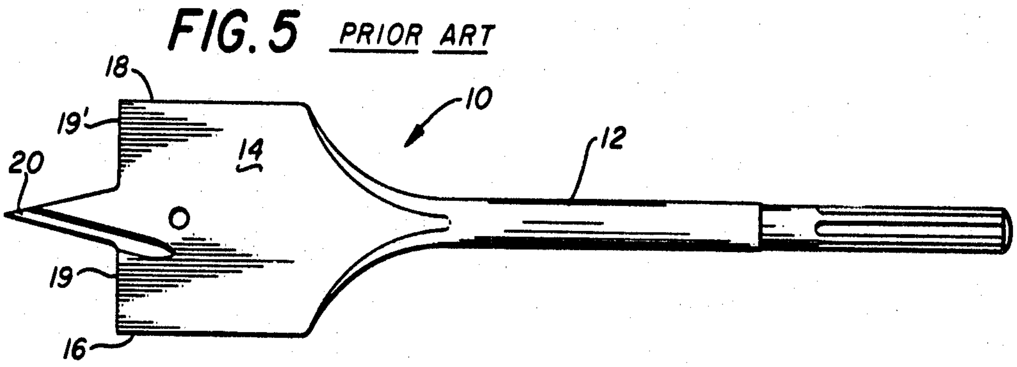
FIG. 5 PRIOR ART
FIG. 5 is a side view of the prior art wood bit disclosed in FIG. 4.

FIGS. 4 and 5 illustrate a prior art flat wood bit 10, of usual construction, for forming holes into a work piece. The bit includes a shaft 12 by which the bit is turned, opposed flats 14, and sides 16 and 18. The forward end of the flat is made into the usual cutting edges 19, 19'. A pilot bit or tip 20 forms the forwardmost end of the flat wood bit.

FIGS. 1–3 and 6–19 illustrate adapter apparatus 22, 122, and 222 made in accordance with the present invention. The adapter apparatus each forms a guide means for the before mentioned flat wood bit and enables a previously drilled hole to be accurately and easily enlarged to some desired larger diameter.

Figure 1:
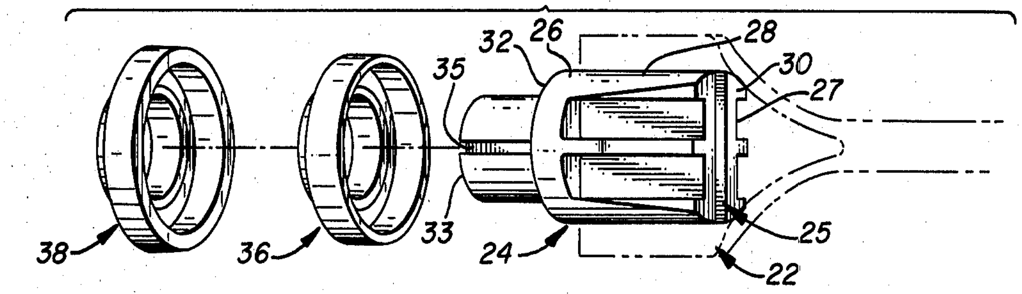
FIG. 1 is an exploded, perspective side view of an adapter device made in accordance with the first embodiment of this invention, shown in combination with a prior art wood bit.
Figure 2:
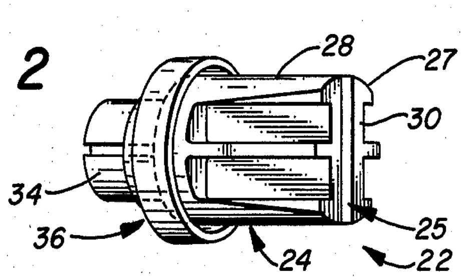
FIG. 2 is another perspective view of the adapter device of FIG. 1, in combination with a cylinder member of this invention.
Figure 3:
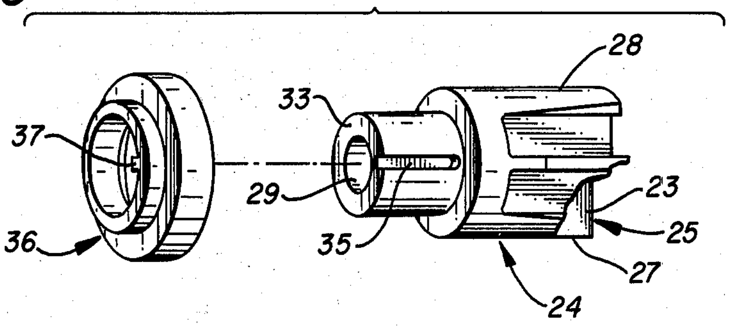
FIG. 3 is an exploded, oblique, perspective view of the adapter apparatus of FIGS. 1 and 2.
Figure 18:
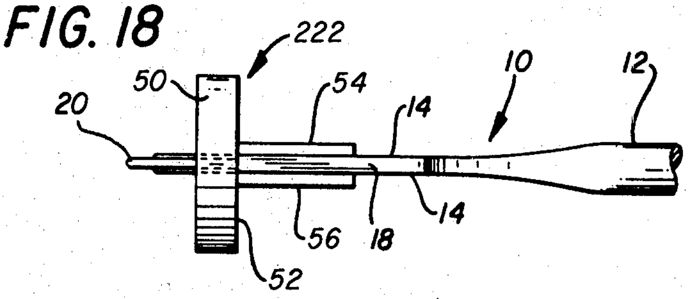
FIG. 18 is a top view of the combination bit and adapter previously disclosed in FIG. 17; and, FIG. 19 illustrates the combination of FIG. 18 in operation.

FIGS. 1–3 and 6–9 set forth a first embodiment 22 of the adapter apparatus of the present invention. A main body 24 has a forward marginal end 26 which is of circular configuration. The diameter at 26 is selected to cause the apparatus to be received within a previously drilled hole of a work piece so that a larger bit 10 can be used in combination therewith for enlarging the previously bored hole. The adapter is reduced in thickness at a location spaced rearwardly from the circular, main body portion 26, so that it is progressively reduced in thickness at 28 towards trailing end 30 thereof. Shoulder 32 is formed between a forwardly directed mandrel, or reduced diameter portion 34, and the larger diameter main body portion 26. As best seen in FIGS. 1–3, the mandrel 34 is slidably received within either of a plurality of cylinders 36 and 38. The mandrel terminates at the forward terminal end 33 of the adapter. Key 37 is formed on the inside diameter of the cylinder and mates with a keyway 35 formed on the mandrel.

Figure 6:
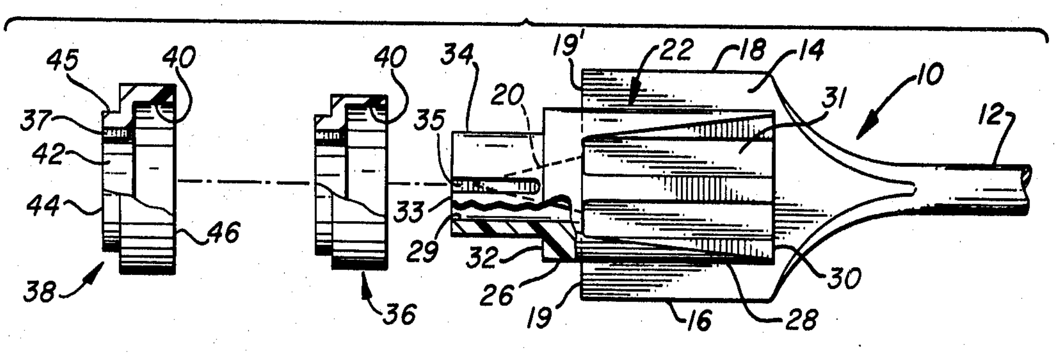
FIG. 6 sets forth a side elevational view of the adapter apparatus seen in FIGS. 1–3, in combination with the bit of FIGS. 4 and 5, with some parts being broken away from the adapter apparatus, and some of the remaining parts being shown in cross-section.
Figure 8:
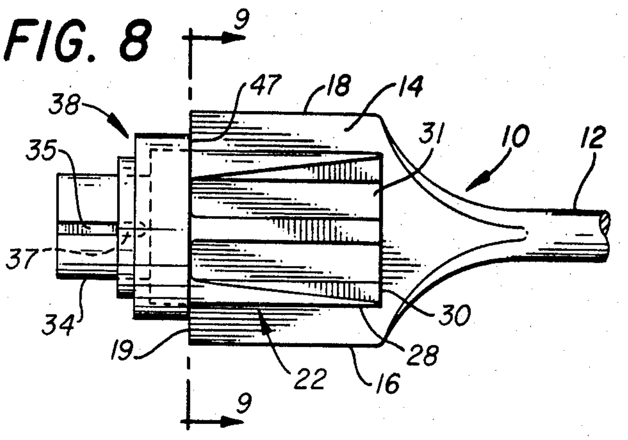
FIG. 8 is a side elevational, fragmentary, assembled view of part of the apparatus illustrated in FIG. 6.

As seen in FIG. 6, together with other figures of the drawings, each of the cylinders includes a large inside diameter, circumferentially extending wall surface 40 which receives, in close tolerance relationship, a forward marginal length of the circular main body 26. A reduced diameter, circular inside portion 42 of the cylinder receives a marginal length of the mandrel 34 of the adapter therewithin. The keyway of the mandrel is in the form of a longitudinal slot 35 which extends from proximity of the shoulder 32 to the terminal end 33 of the mandrel. The slot slidably receives the key 37 in close tolerance relationship therewithin.

The cylinders each further include a forward end 44 which is opposed to a rear end 46. Cutout 45 serves as a pilot and conserves material of construction.

In FIGS. 6–9, the cylinder 36 is illustrated in combination with the adapter 22 and a prior art flat wood bit 10. Interface 47 is formed between the adapter and the cylinder. A rear marginal edge portion of the cylinder is abuttingly received against the forward terminal end 19 of the flat bit 10. The slot 35 of the adapter receives the key 37 of the cylinder therewithin, thereby preventing relative rotation between the bit, adapter, and cylinder.

Figure 10:
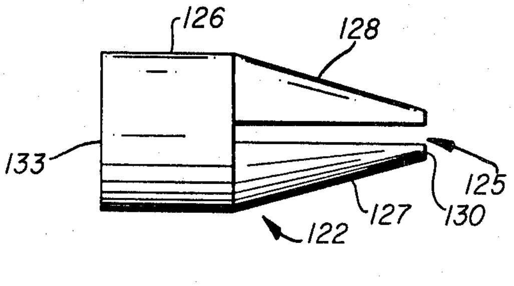
FIG. 10 is a side elevational view of another embodiment of the present invention.
Figure 11:
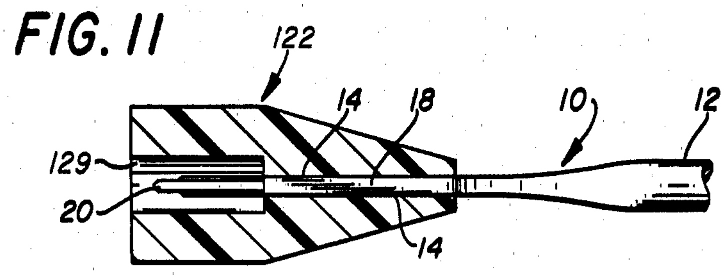
FIG. 11 is a cross-sectional view of the apparatus disclosed in FIG. 10, together with the prior art bit of FIGS. 4 and 5.
Figure 13:
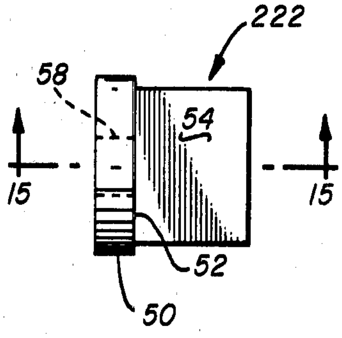
FIG. 13 is a side elevational view of an adapter made in accordance with another embodiment of the present invention.
Figure 12:
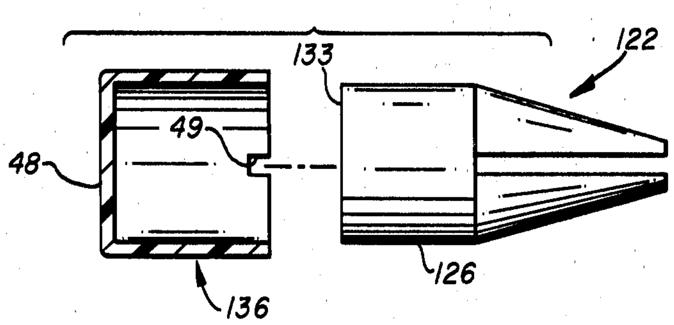
FIG. 12 is a dissembled, part cross-sectional view of a modification of the apparatus disclosed in FIG. 10.
Figure 14:
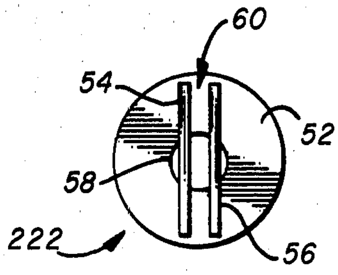
FIG. 14 is a rear view of the adapter apparatus disclosed in FIG. 13.
Figure 15:
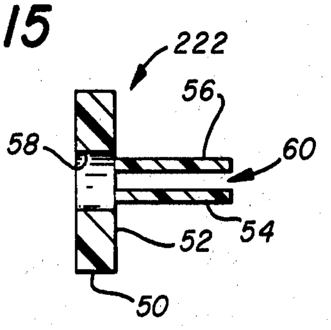
FIG. 15 is a cross-sectional view taken along line 15—15 of FIG. 13.
Figure 16:
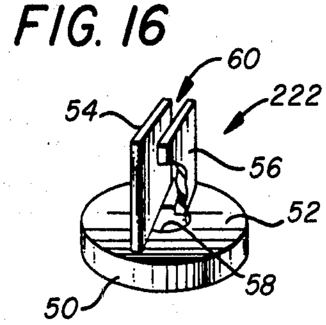
FIG. 16 is an enlarged, perspective view of the adapter disclosed in some of the foregoing figures, with some parts being broken away therefrom.
Figure 17:
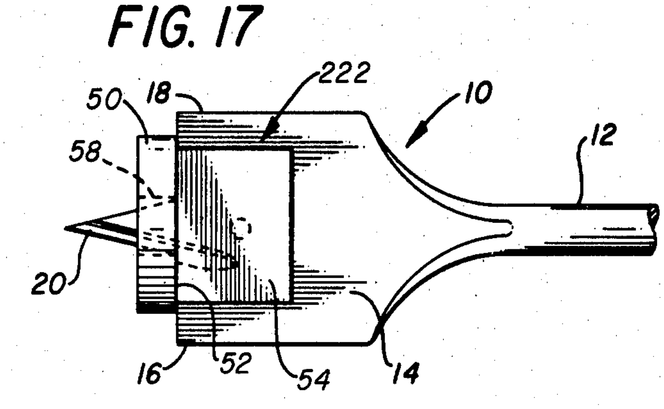
FIG. 17 illustrates the prior art bit of FIGS. 4 and 5 in combination with the adapter of FIGS. 13–16.

In the embodiment of the invention seen disclosed in FIGS. 10–12, the adapter apparatus 122 has a main body 126, the forward marginal end of which is of constant diameter, and which tapers into the illustrated spaced keepers 127, 128 at the rear marginal end thereof. The terminal ends 130 of the keepers are spaced from a forward end 133 of the main body. Slot 125 is formed between the spaced keepers and tightly receives the opposed flats of the wood bit therewithin.

In the embodiment set forth in FIGS. 1–3 and 6–12, the progressively reduced thickness of the keepers provides for adjacent flat faces 23 which are spaced apart from one another to form the before mentioned slot 25. The slot preferably is slightly smaller than the thickness measured at the flats of the bit, so that when the flats of the bit are forcibly received within the slot, the keepers are sprung slightly apart, thereby increasing the friction by which the adapter is releasably held attached to the wood bit. The pilot bit tip 20 is received within cavity 29, with the tip being recessed therewithin, thereby precluding injury to one's hand or finger as the components of the apparatus are assembled into operative relationship respective to one another.

In the illustrative embodiment of FIGS. 10–12, and in particular, as seen illustrated in FIG. 12, the cylinder 136 of the adapter 122 is provided with opposed cutouts 49 in the trailing end thereof so that the cap 136 is slidably received in a telescoping manner about the constant diameter body portion 126 of the adapter. The opposed cutouts 49 each engage the marginal, forward opposed ends of the bit flat, thereby preventing relative rotation between the cap and the adapter when the apparatus is in use. A plurality of various different size caps enable a single adapter to be used for enlarging a number of previously bored, different size holes.

In the embodiment of the invention seen in FIGS. 13–19, the adapter means 222 includes a circular body 50 having a rear face 52 from which there extends spaced keepers 54 and 56. The body includes a centrally located cavity 58, illustrated herein as an aperture, with the aforesaid keepers being equally spaced on either side of the cavity, thereby providing an outwardly opening slot 60, which communicates with the cavity, and which receives the flats of the bit tightly therebetween, as best seen illustrated in FIGS. 17–19.

Figure 19:
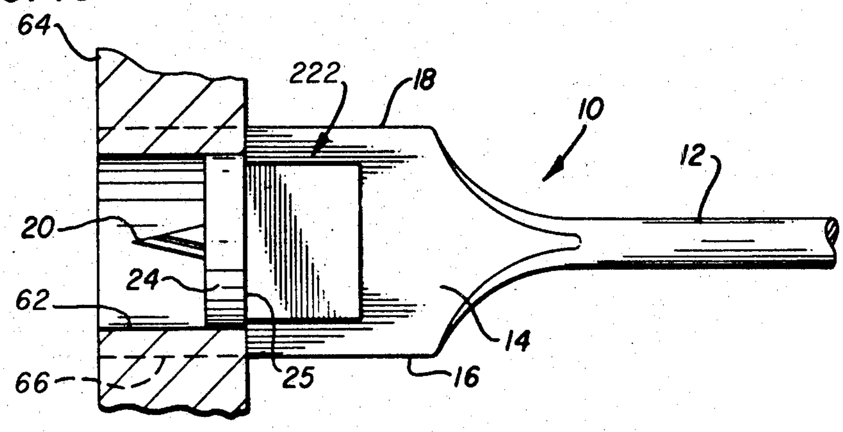

As seen in FIG. 19, a previously drilled hole 62 has been formed through a work piece 64, and it is desired to enlarge the hole to a new diameter 66. Accordingly, a larger wood bit 10 is selected which has the desired larger diameter 66; an adapter 222 is selected having a diameter 62; and the adapter is fitted to the flat bit 10 by forcing the keepers 54, 56 to spring slightly apart as the opposed flats of the bit are received therebetween, and with the point 20 of the pilot bit being aligned in indexed relationship with the cavity 58, thereby removably affixing the adapter to the bit by high frictional forces developed between the inner adjacent faces of the slightly sprung apart keepers and the opposed faces of the flats of the bit. A portion of the inner, adjacent marginal cutting edges 19, 19' of the bit are abuttingly received against the rear face 52 of the circular body. The outside diameter of the circular body preferably is slightly smaller than the previously drilled hole 62 so that the outer peripheral surface of the body rotates in close tolerance, low friction relationship respective to the inner peripheral wall surfaces of the hole 62. This enables the enlarged hole diameter at 66 to be accurately and easily formed through the work piece.

The width of the slot at 25 can be selected to accommodate any number of different size flat wood bits by providing the plastic injection mold with a removably insert at the rear marginal end of the mold which forms the inner sidewalls of the keepers. Hence the thickness of the tongue-like insert of the mold can be selected to provide a slot of any desired opening. This expedient enables a single mold to be adapted for providing an adapter which will accommodate most any wood bit.

I claim:

1. In a flat wood bit for boring holes through a workpiece, the bit having opposed cutting edges positioned rearwardly of a pilot bit, the combination of said wood bit of an adapter for enlarging a hole previously bored into the workpiece;

said adapter having a circular body of a diameter to be slidably received in close tolerance relationship within the previously bored hole of the workpiece; said circular body having a forward and a rear face;

a cavity formed centrally within said circular body for receiving the pilot bit of the wood bit therewithin; spaced upstanding keepers having one end affixed to and another end extending from said rear face, said keepers having a flat face on the nearest adjacent side thereof;

said keepers being positioned in equally spaced relationship respective to the center of said rear face, with said cavity being located equidistance therebetween;

said keepers have outermost faces tapered towards one another in a rearward direction so that the keepers are each reduced in thickness towards said another end;

the space between said keepers being smaller than the thickness of the wood bit so that the keepers must be sprung slightly apart when the wood bit is received therebetween, thereby enabling the adapter to be removably attached to the forward, marginal end of the wood bit;

said rear face of said adapter is abuttingly received against the opposed cutting edges of the bit, with an outer marginal portion of the cutting edges extending radially away from said circular body, so that the outer marginal portion of the cutting edges engage the workpiece and enlarge the previously bored hole.

2. The combination of claim 1 wherein there is included a cylinder having an inside diameter which removably receives the outside diameter of the circular body therewithin; and, said cylinder has an outside diameter which is received in close tolerance relationship within the previously bored hole so that the previously bored hole can be enlarged by the bit.

3. The combination of claim 1 wherein there is included a cylinder having an inside diameter which removably receives the outside diameter of the forward marginal end of the circular body therewithin; and, said cylinder has an outside diameter which is received in close tolerance relationship within the previously bored hole so that the previously bored hole can be enlarged by the bit.

4. An adapter for use in combination with a flat wood bit so that a previously bored hole formed in a workpiece can be enlarged;

wherein the wood bit has a shank, a flat, the forward end of the flat forms opposed cutting edges, and a pilot bit being centrally located between and extending forwardly of the cutting edges;

said adapter includes a circular body of a diameter slightly less than the previously bored hole so that the circular body is guidably received in close tolerance relationship within the previously bored hole; said circular body includes a forward face and a rear face;

a centrally located cavity formed within said circular body for receiving the pilot bit therewithin so that a marginal length of the cutting edges are abuttingly received against the rear face of the circular body, with an outer marginal portion of the cutting edge extending radially away from said circular body, so that the outer marginal portion of the cutting edges engage the workpiece to enlarge the previously bored hole;

spaced keepers having an attached end and a free end, said attached end being affixed to said rear face and said free end being spaced therefrom, each keeper includes a flat face, the flat face of one keeper is located adjacent to the flat face of the other keeper, said keepers are spaced respective to one another an amount to be biased apart as the flat of the bit is received therebetween;

said keepers have outermost faces tapered towards one another in a rearward direction so that the keepers are each reduced in thickness towards said free end.

5. The adapter of claim 4 wherein there is included a cylinder having an inside diameter which removably receives the outside diameter of a forward marginal end of the circular body therewithin; and, said cylinder has an outside diameter which is received in close tolerance relationship within the previously bored hole so that the previously bored hole can be enlarged by the bit.

6. In a flat wood bit having opposed cutting edges positioned rearwardly of a centrally located pilot bit so that the bit can be used for boring holes through a workpiece, the combination with said wood bit of an adapter for enlarging a hole previously bored into the workpiece;

said adapter having a cylindrical body of a diameter to be slidably received in close tolerance relationship within the previously bored hole of the workpiece; said body includes a forward end and a rear end;

a cavity formed centrally within said circular body for receiving the pilot bit of the wood bit therewithin; spaced upstanding keepers arranged adjacent to one another and having one end affixed to and another end extending from said rear end, said keepers each include a flat face on the nearest adjacent slide thereof;

said keepers being positioned in equally spaced relationship respective to the center of said rear end, with said cavity being located equidistance therebetween;

said keepers have outermost faces tapered towards one another in a rearward direction so that the keepers are each reduced in thickness towards said another end;

the space between said keepers being smaller than the thickness of the wood bit so that the keepers must be sprung slightly apart when the wood bit is received therebetween, thereby enabling the adapter to be removably attached to the forward, marginal end of the wood bit.

7. The combination of claim 6 wherein there is included a cylinder having an inside diameter which removably receives the outside diameter of the circular body therewithin; and, said cylinder has an outside diameter which is received in close tolerance relationship within the previously bored hole so that the previously bored hole can be enlarged by the bit.

* * * * *

UNITED STATES PATENT AND TRADEMARK OFFICE

CERTIFICATE OF CORRECTION

PATENT NO. : 4,289,432

DATED : SEPTEMBER 15, 1981

INVENTOR(S) : JOHNNY C. ELKINS and MARVIN C. HANZ

It is certified that error appears in the above—identified patent and that said Letters Patent is hereby corrected as shown below:

Claim 6, line 46, substitute --side-- for "slide".

Signed and Sealed this

***Second* Day of *February 1982***

[SEAL]

*Attest:*

GERALD J. MOSSINGHOFF

*Attesting Officer* *Commissioner of Patents and Trademarks*